C. M. MAPES.
PIPE.
APPLICATION FILED SEPT. 14, 1915. RENEWED JULY 11, 1921.
1,407,038.
Patented Feb. 21, 1922.
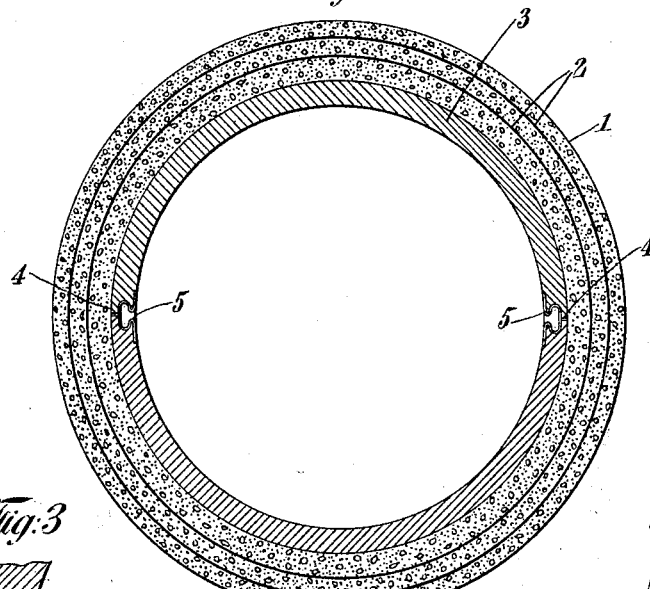
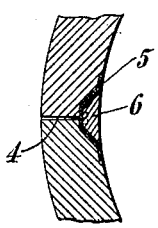
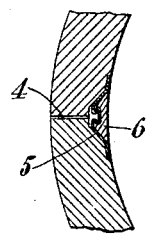
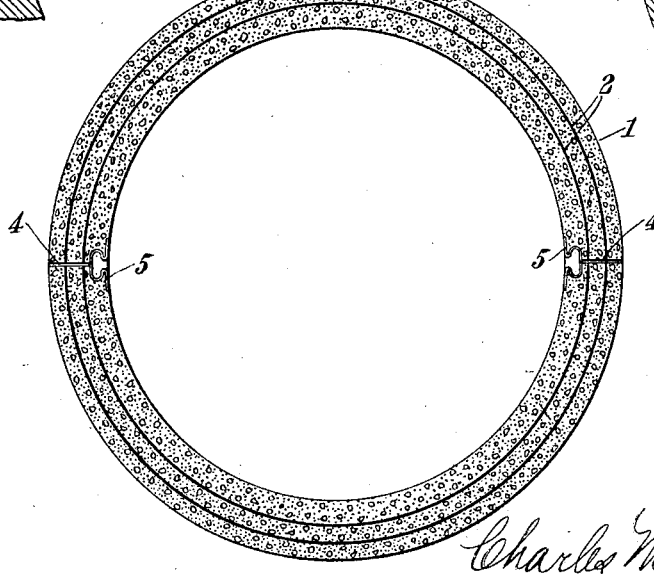
INVENTOR
Charles M. Mapes
BY
Prindle, Wright & Small
ATTORNEYS

UNITED STATES PATENT OFFICE.

CHARLES M. MAPES, OF RUTHERFORD, NEW JERSEY.

PIPE.

1,407,038. Specification of Letters Patent. Patented Feb. 21, 1922.

Application filed September 14, 1915, Serial No. 50,569. Renewed July 11, 1921. Serial No. 483,768.

*To all whom it may concern:*

Be it known that I, CHARLES M. MAPES, of Rutherford, in the county of Bergen and in the State of New Jersey, have invented a certain new and useful Improvement in Pipes, and do hereby declare that the following is a full, clear, and exact description thereof.

My invention relates to pipes for conveying water or other fluids or gasses and has for its object to provide such a pipe adapted to withstand hydrostatic pressure without leakage.

A satisfactory pipe to convey water under pressure long has been desired. Such a pipe must be able to withstand high internal pressure, must not leak when subjected to such pressure, and must be inexpensive and convenient to manufacture.

A metal pipe of sufficient strength to withstand the necessary pressure without leakage, is too expensive for many purposes. A concrete pipe is inexpensive and convenient to manufacture, but it will not stand a high internal pressure unless its walls are so thick that its cost and bulk are prohibitive.

A pipe constructed of metal and of concrete, such as a reinforced concrete pipe, partially fulfills the necessary conditions, but it has not been possible heretofore to construct an economical and practical reinforced concrete pipe which will withstand high internal pressure without leakage. If enough reinforcement is used to prevent any expansion of the pipe under the internal pressure to which it will be subjected in use, the cost still is too high for many purposes. If the amount of reinforcement used is reduced, so that the reinforcing members will stretch under use and the increasing resistance to stretch of the reinforcing members is utilized to withstand the said internal pressure, the concrete will crack, as its elastic limit is so low compared with that of the reinforcing members, that the elastic limit of the concrete will be exceeded long before the predetermined internal pressure is reached for which the pipe is designed, although said internal pressure is less than the reinforcing members are designed to carry without reaching their elastic limit. The leakage caused by these cracks in the concrete cannot be obviated merely by treating the inner surface of the pipe with a water-proof coating, or by filling the voids in the pipe with a water-repellant material as in the integral system of waterproofing, for as soon as the elastic limit of the concrete is exceeded under conditions of use, leakage cracks will develop, irrespective of these treating methods.

It is the object of my invention to permit the use of reinforcing members of such size that their elastic limit can be utilized, and cracks in the concrete are prevented by providing one or more joints closed by a flexible member.

A further object is to apply this member either to lined or unlined pipes.

Other and further objects of my invention will be apparent from the following description and from an inspection of the accompanying drawing, in which:

Figure 1 is a cross-section of a pipe illustrating one embodiment of my invention;

Figure 2 a section similar to Figure 1 illustrating a different embodiment of my invention; and Figures 3 and 4 enlarged detail sections illustrating still further embodiments of my invention.

Similar reference characters refer to similar parts throughout the drawings.

While I have illustrated my invention by several embodiments thereof, it is not to be restricted to such embodiments, which are to be regarded as typical only of many embodiments.

Referring to the composite pipe embodiment illustrated by Figure 1 of the drawings, reference character 1 indicates an outer pipe and reference character 3 an inner pipe. In this embodiment, the outer pipe is represented as of concrete construction, reinforced by rods 2. The inner pipe may be of any non-hygroscopic, impermeable material, and preferably is of material having inherent stability around which armored pipe 1 may be shrunk. In order to prevent the development of leakage cracks when the internal hydrostatic pressure is sufficient to cause rods 2 to stretch beyond the limit of elasticity in the concrete, inner pipe 3 is provided with one or more openings 4, in which is inserted flexible means to prevent the escape of water, such as strips 5, preferably of copper or other non-corroding metal, and secured to each side of the opening in such a manner as to prevent the escape of water through said opening.

Referring to the embodiment illustrated in Figure 2 of the drawings, reference character 1 indicates a single pipe of any desired material, as concrete, having reinforcing rods 2. In this embodiment the inner pipe is omitted, and the opening or openings 4 with means 5 to prevent the escape of water, are provided in the single pipe.

Figures 3 and 4 represent a modified form of water-tight joint, comprising a wedge-shaped block 6 of any desired material and so arranged as to close the opening caused by internal hydrostatic pressure by means of the same pressure exerted on said wedge. In Figure 3, wedge 6 is adapted to seat on the bottom thereof, while in Figure 4, wedge 6 is adapted to seat on its sides. It is obvious that both said methods of seating may be used if desired.

Other embodiments, adaptations, and uses of my invention will be apparent to those skilled in the art without departing therefrom or from the scope of the claims.

What I claim is:

1. As an article of manufacture, a water pipe of reinforced concrete the reinforcements of which are adapted to stretch when the pipe is subjected to its predetermined internal hydrostatic pressure and having a longitudinal opening therein, and means to render said opening waterproof comprising a bent, flexible strip having its edges fixed on each side of said opening and adapted to maintain said opening waterproof despite movement of said sides and edges to or from each other.

2. As an article of manufacture, a water pipe of reinforced concrete the reinforcements of which are adapted to stretch when the pipe is subjected to its predetermined internal hydrostatic pressure and having a longitudinal opening therein, and means to render said opening waterproof comprising a bent, flexible strip having its edges fixed on each side of said opening and adapted to maintain said opening waterproof despite movement of said sides and edges to or from each other and a block secured in said strip substantially flush with the inner surface of said pipe.

3. As an article of manufacture, a water pipe of reinforced concrete the reinforcements of which are adapted to stretch when the pipe is subjected to its predetermined internal hydrostatic pressure, an inner non-hygroscopic lining in said pipe having a longitudinal opening therein, and means to render said opening waterproof comprising a bent, flexible strip having its edges fixed on each side of said opening and adapted to maintain said opening waterproof despite movement of said sides and edges to or from each other.

4. As an article of manufacture, a water pipe of reinforced concrete the reinforcements of which are adapted to stretch when the pipe is subjected to its predetermined internal hydrostatic pressure, an inner non-hygroscopic lining in said pipe having a longitudinal opening therein, and means to render said opening waterproof comprising a bent, flexible strip having its edges fixed on each side of said opening and adapted to maintain said opening waterproof despite movement of said sides and edges to or from each other and a block secured in said strip substantially flush with the inner surface of said pipe.

5. As an article of manufacture, a water pipe of concrete having a longitudinal opening therein and provided with reinforcements which are adapted to stretch when the pipe is subjected to its predetermined internal hydrostatic pressure, and means to render said opening waterproof comprising a flexible strip having its edges fixed on each side of said opening and adapted to maintain said opening waterproof despite movement of said sides to or from each other.

6. As an article of manufacture, a water pipe of concrete having a longitudinal opening therein and provided with reinforcements which are adapted to stretch when the pipe is subjected to its predetermined internal hydrostatic pressure, and means to render said opening waterproof comprising a flexible strip having its edges fixed on each side of said opening and adapted to maintain said opening waterproof despite movement of said sides to or from each other and a block secured in said strip substantially flush with the inner surface of said pipe.

7. As an article of manufacture, a water pipe of reinforced concrete the reinforcements of which are adapted to stretch when the pipe is subjected to its predetermined internal hydrostatic pressure, an inner non-hygroscopic lining in said pipe having a longitudinal opening therein, and means to render said opening waterproof comprising a flexible strip having its edges fixed on each side of said opening and adapted to maintain said opening waterproof despite movement of said sides to or from each other.

8. As an article of manufacture, a water pipe of concrete provided with reinforcements which are adapted to stretch when the pipe is subjected to its predetermined internal hydrostatic pressure, an inner non-hygroscopic lining in said pipe having a longitudinal opening therein, and means to render said opening waterproof comprising a flexible strip having its edges fixed on each side of said opening and adapted to maintain said opening waterproof despite movement of said sides to or from each other and a block secured in said strip substantially flush with the inner surface of said pipe.

In testimony that I claim the foregoing I have hereunto set my hand.

CHARLES M. MAPES.

Witnesses:
V. G. LLOYD,
AGNES F. McLAUGHLIN.